United States Patent [19]
Mednikow

[11] 3,831,975
[45] Aug. 27, 1974

[54] SAFETY DEVICE FOR MOTOR VEHICLES
[76] Inventor: Leon Mednikow, 290 9th Ave., New York, N.Y. 10001
[22] Filed: Sept. 17, 1973
[21] Appl. No.: 397,981

[52] U.S. Cl............................................ 280/150 B
[51] Int. Cl................................................. B60r 21/10
[58] Field of Search ................................ 280/150 B

[56] References Cited
UNITED STATES PATENTS

| | | | |
|---|---|---|---|
| 3,650,542 | 3/1972 | Shimano.......................... | 280/150 B |
| 3,692,327 | 9/1972 | Barrick............................ | 280/150 B |
| 3,782,756 | 1/1974 | Brown............................. | 280/150 B |

*Primary Examiner*—Robert R. Song

[57] ABSTRACT

This invention is directed to a safety device for a motor vehicle such as an automobile, a truck or truck cab, a speed boat, an air plane, or the like, which in a preferred embodiment the front seat passenger's seat and driver's seat is made more safe against fatal accidents or injuries of a severe nature to passanger and/or driver in major impact collisions involving the motor vehicle, the safety device being a safety net which extends between two guide wires extending from a forward overhead ceiling of the automobile to a rearwardly lateral position on either side of the seat along which paired parallel guide wires the net is slidable to open-up the net, the top of the net being anchored at the top of the guide wires or flexible cables and between the guide wires while the base of the net slides down the guide wire, each side of the seat bringing the base of the net and a steel cord having appropriate padding therearound across the lap in the nature of a seat belt, and at the base of the net on each guide wire there being a snap device such that when the net drops it will be locked into the down position but the locking device being an easily releasable locking device for ease in escaping from the net in the event of a serious accident to avoid accidental trapping of the passenger or driver within the automobile compartment (for example) in the event of fire. The release of the net is brought about or actuated by preferably an inertia switch registering impact above a predetermined level. Also in a preferred embodiment there is included a cartridge element associated with the release mechanism for the net such that upon impact and the predetermined amount of inertia the cartridge is fired to propel the base of the net downwardly thereby increasing the speed with which the net drops and also avoiding any possibility of the net not dropping because offorward momentum of the net and therefore friction along the guide members and/or torque in an upward direction. The net as it drops, drops slightly rearwardly of the steering wheel in a preferred embodiment, but forwardly of the upper body and face of the driver and the front-seat passenger, while the steel strap extending along the base of the net serves to further facilitate inhibition of or against the body of the person(s) being thrown forwardly from the seated position.

4 Claims, 6 Drawing Figures

PATENTED AUG 27 1974  3,831,975
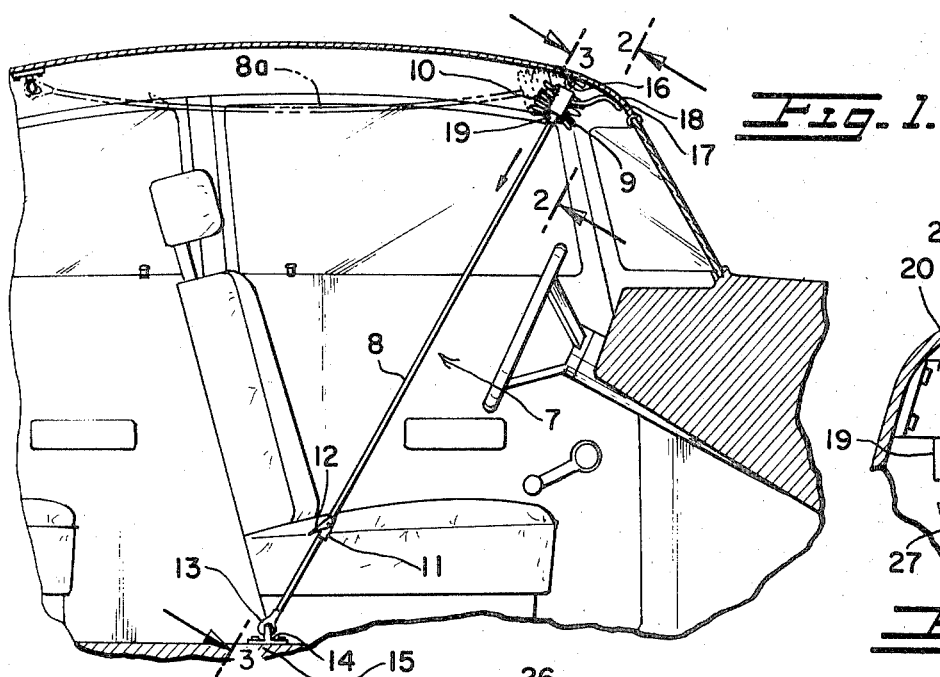
Fig. 1.
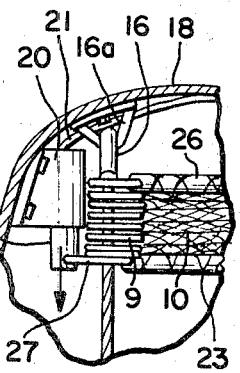
Fig. 2.
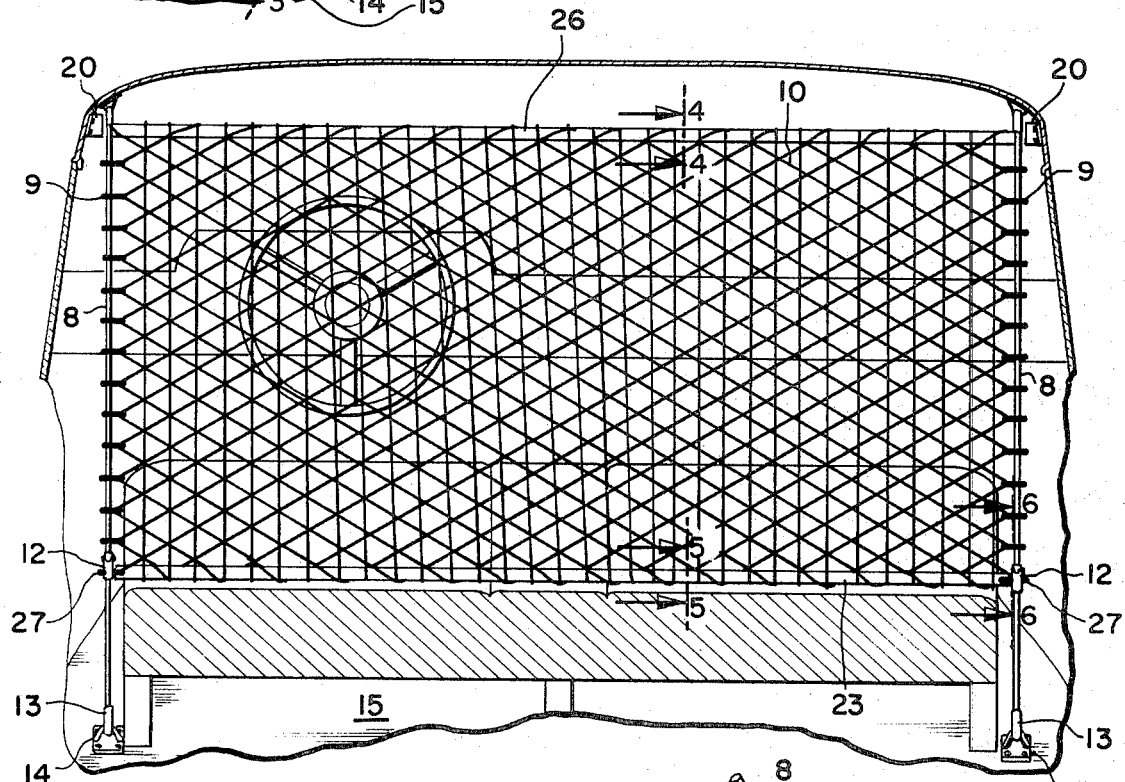
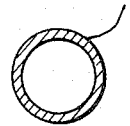
Fig. 4.
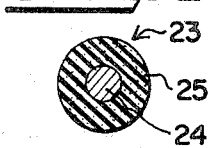
Fig. 3. Fig. 5.
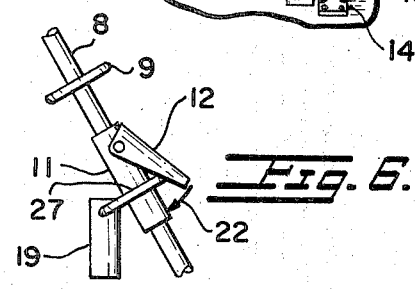
Fig. 6.

SAFETY DEVICE FOR MOTOR VEHICLES

This invention relates to a safety device for preventing a driver and a front seat passenger from being thrown into the steering wheel and/or against the dash board and/or windshield.

BACKGROUND TO THE INVENTION

Prior to the present invention, in years past there have been many fatalities and/or disfiguring automobile accidents to both the driver and the passenger in the front seat, of motor vehicles such as automobiles, trucks or truck cabs, speed boats, airplanes, or the like, especially to the front seat passenger to the right of the driver, such seat typically being known as the "death seat," because of the probability of serious or fatal injury to that passenger as well as possibly the driver in accidents ranging from minor accidents when the driver is thrown against the steering wheel and/or windshield or dashboard, and/or when the front seat passenger is thrown against the dash board or against or through the windshield or the like. More recently in the era in which a greater safety consciousness has begun to prevail on the public and in the United States Congress, the automobile manufacturers have been compelled by public pressure to arrive at some sort of safety features which will reduce the death-trap nature of automobiles. Although many possible solutions have been suggested, the most widely presently accepted safety device that as of this time appears to be destined to become installed on automobiles in the near future is the type safety device which includes an explosive-like release charge initiated by inertia upon impact of the automobile or sudden stops or the like, whereby large voluminous cushion bags immediately become inflated in front of each of the driver and the front seat passenger pinning these persons against the front portion of the back-support of the front seat of the automobile and thereby avoiding the greater possibility of these persons being thrown forward into the steering wheel, the dash board, and/or the windshield, or the like. Unfortunately however, in the event of malfunction or miscalculation in the calibrating of the inertia device, or in the event of sudden stops or sudden movements in an effort of a driver to avoid an accident, there is the real existing possibility of a fatal accident in fact being caused by these inflatable-type safety devices because of the explosion thereof in the face of the driver to startle the driver and to pin the driver away from the steering wheel and other controls, pinning the driver against the upright portion of the front seat and total remove thereby the driver from any possibility of continuing in the control of the automobile and ability to discern what is going on, and thereby possibly causing his automobile to go out of control where otherwise it might not, and in an out of control state "causing" serious accident(s) and/or deaths and/or injury to other auto occupants and/or to pedestrians, as well as the life and limb of the driver and accompanying passengers thereby being endangered or threatened. Such a shortcoming is a major hazard to these type devices and it is feared will result in many injuries and/or deaths which are precisely what the devices are intended to prevent rather than cause.

SUMMARY OF THE INVENTION DISCLOSURE

An object of the present invention is to overcome one or more difficulties and problems of the prior type devices, as well as to provide an increased measure of safety and security while avoiding total loss of control, as well as the fact that it is an object of the present invention which is less apt to injure the persons in the front seat when the device becomes activated.

Another object is to provide for continued visibility by the driver even after the safety device has been actuated.

Another object is to provide for ready escape from the automobile after the device has been actuated, with the bag type it being a real possibility that the driver and/or passenger of the front seat cannot free themselves from their respective pinned positions once the bags become inflated against their chests.

Another object is to provide such a safety device together with practical means for storage in an out-of-the way position and state during the entrance and exiting from the automobile of the respective driver and/or passenger of the front seat, and to provide an aesthetically pleasing appearance acceptable to the general buying public.

Other objects become apparent from the preceding and following disclosure.

One or more objects of the present invention are obtained by the invention as defined herein.

The present invention is directed to, in particular, a safety net device and guide tracks extending from a forward ceiling of the cab in the vicinity of the driver and front-seat passenger to positions on either (both) side(s) of the front seat rearwardly whereby the guide tracks extend in a slanted fashion downwardly and rearwardly for the guidance of the bottom of the dropping net and of the anchored sides of the net all of which are freely movable therealong upon their release from the locked position at the top of the guide members, and the safety device includes a locking mechanism which is releasable when activated by inertia or other suitable means upon impact of the automobile and/or upon sudden jerking motion of an abnormal type typical of that of an impending serious automobile accident which could lead to serious injury to the driver and/or passenger in the front seat of the automobile or truck cab or the like. However, it should be noted that additionally the safety device may be employed on other types of motor vehicles such as air planes, motor boats, or the like. In a preferred embodiment of the invention, as a part of the net, the net itself is a padded plastic fabric or steel mesh and at the base of the net is a padded sturdy steel cord of a flexible nature extending across the lap(s) of the driver and/or passenger when the net is in the downwardly extended position, and each of opposite ends of the cord being attached to a particular weighted member slidable along the guide wire on its respective side of the seat or attached to other linking members that are slidable along the guide wires or flexible cables and that are attached to the net, and at the base or near the base of each of the respective guide wires there being provided an automatic catch means whereby when the weighted member slides down the guide wire it immediately becomes automatically locked into its securing position to thereby resist forces of the front seat passenger and/or driver being thrown forwardly upon impact of the automobile, and each of the guide wires including preferably at their respective bases a hook or other latch means for anchoring to the floor structure of the automobile or to the side of the seat of the automobile immediately after entrance into the automobile front seat by the driver and/or passenger on their respective sides of the front seat. Also preferably associated with the catch means is an easily and accessibly operated and located release mechanism for releasing the latch lock means from its downward position thereby affording ready escape from the automobile once the accident is over, whereby the hazard of being trapped in the automobile immediately after the accident is substantially avoided. This, it should be noted, is in opposite contrast to present seat belts which very often after an accident are almost impossible to remove to get the passenger out of the front seat because of the twisted state of the seat belt and buckle or the buckle being twisted out of an accessible or releasable position or location. It is a fact that in many accidents that the drivers have been burnt to death because of the inability of persons to rapidly pull the driver and/or passenger from the car before flames or the like envelope the automobile, because of the inability to release the person(s) from locked-on seat belts.

In a preferred embodiment of the invention there is provided a projectile cartridge associated with a releasible lock means at the top of the guide wires whereby upon activation of the release mechanism by inertia or other suitable impact-registering means, there is activated a projectile such as a powder or explosive cartridge which fires to propel the weighted member in the nature of a bullet downwardly on each side guide wire to thereby increase the speed at which the net becomes extended downwardly in front of the driver and/or passenger of the front seat, and also to avoid the risk and/or hazardous possibility that the forward inertia of the automobile would so press the net and link elements on either side of the net forwardly as to inhibit speedy dropping downwardly of the safety net rapidly enough to catch the person being thrown forwardly.

The invention may be better understood by reference to the following figures.

THE FIGURES

FIG. 1 illustrates an in-part side in-part cross-sectional view of an automobile cab disclosing essentially a side view of a guide wire or flexible cable on one side of the automobile, it being understood that there would be a like-guide wire on the other side of the seat and automobile, together with the overall mechanism, this net and weighted member being disclosed in a collapsed withdrawn state in the nature that it would normally appear in normal use of the automobile after the driver had entered the automobile and latched the guide wires to the floor.

FIG. 2 illustrates an in-part and enlarged view of the upper latching section of the net and guide wire and weighted member projectile portion of the invention as shown in FIG. 1.

FIG. 3 illustrates a typical view as taken along lines 3—3 pf FIG. 1 when the net has become extended, whereas in FIG. 1 the net is shown in the non-extended state.

FIG. 4 illustrates an in-part view as taken along lines 4—4 of FIG. 3, illustrating the typical tubular upper support of the net itself.

FIG. 5 illustrates a cross-sectional view of the steel cord belt member that extends across the base of the net and serves as a seat belt in effect, this being shown also in cross-sectional view.

FIG. 6 illustrates an enlarged view, the mechanism and typical appearance of a locking means over which the bottom linking member or weighted element becomes secured against being pulled accidentally upwardly once the net has been projected or dropped downwardly.

DETAILED DESCRIPTION OF THE INVENTION

In greater detail, with reference to FIGS. 1 through 6, there is shown a safety net device 7 in side view in FIG. 1, including a guide cable 8 and hoop-like links 9 slidably circumscribing the cable 8, with the links being connected to the edges of the upright sides of the net 10 such that when released to fall downwardly the weighted projectile 19 pulls downwardly the base link 27 to and over a locking device 11 having a spring-biased one-way catch 12 over which the base link 27 slides downwardly but cannot slide upwardly, as the base link 27 slides downwardly over the pivoted lever catch 12, the distal end of the lever catch 12 moves in direction 20 permitting the lever to collapse inwardly so that the base link 27 moves over the catch 12 which immediately springs back upwardly preventing the base link 27 from being pulled back upwardly without a person first manually pressing downwardly on the lever catch 12. The guide cable 8 includes at its distal end a detachable hook-latch member 13 latchable to a floor-anchored loop member 14 anchored by typically screws, to the floor 15 of the automobile, while the opposite end of the cable includes a permanent and fixed loop or hook member 16 hooked onto a permanently fixedly mounted loop member 16a mounted fixedly on the ceiling car top 18. The weighted projectile member 19 is mountable within a downwardly directed firing mechanism which may be air-propulsion or a powder-explosive charge, or other equivalent projectile-propelling means. Typically leading from the projectile propelling member is an electric cord or lead 21. Also attached to the base link 27 is the flexible steel rubber-coated or other cushion-coated material cord 23 extending between opposite guide cables at the base of the net 10 secured fixedly to the entire bottom edge of the net 10 extending across between the guide wires 8. In particular, FIG. 5 illustrates a cross-sectional view of the cushioned cable or cord 23, while FIG. 4 illustrates a cross-sectional view of the upper tubular member 26. In the FIG. 5 illustration there is shown metallic preferably flexible steel cable core 24 and the typically rubber cushioning material 25, of the cable member 23. FIG. 6 illustrates a side and more detailed view of the latching mechanism for locking detachably the net in the downwardly extending position.

Now, in the light of the above identification of various parts and elements and means, it can be understood that upon activation of a conventional or other desired inertia switch (not shown because such is conventional) typically the lead 21 would be connected thereto to convey an electrical signal charge to the projecting means 20 to thereby actuate the projecting means 20 which as and when activated releases the projectile and/or shoots downwardly the projectile 19 to thereby drag downwardly the base link 27 and the base cord element 23 which in the downwardly moving direction pulls downwardly the following or trailing links 9 and accordingly extends in an opening fashion downwardly the net 10 stretching the net between the bottom cord 23 and the upper upper tubular net support member 26. Accordingly, when cord 23 is pulled downwardly with the base links 27 on each of opposite sides of the seat is latched by the latching member 11 catch 12, the cord 23 is pulled across the laps of the driver and/or passenger while the net 10 is pulled in front of the chest and face of the driver and/or passenger thereby preventing the driver and/or passenger from being thrown forwardly against the steering wheel, dash board, and/or windshield.

It is believed that accordingly serious injury can be avoided to either the driver and his passenger if any, while concurrently the driver is able to maintain his vision through the net as well as the net not having any forceful effect in slapping the driver and passenger in the face(s) or pinning him(them) backwardly against the seat, and the driver being able to easily maneuver the lever 12 rapidly to effect escape from the latch seat-belt-like cord 23.

It should be further noted that a particular advantage of this safety device is the fact that a typical driver and passenger, even though a great deal has been said and made of the dangers of riding with unfastened seat-belts, does not always fasten his seat belt because of laziness or ineptness, and that the seat belt-like cord 23 is an emergency seat belt in effect which at the last moment before impact-throwing of the driver forwardly anchors the upper legs and body of the driver and/or passenger to the front seat, as well as the net preventing back injury as well as preventing face and/or chest or arm injury.

It is within the scope of the present invention to make various modifications and variations and substitution of equivalents as would be apparent to a person of ordinary skill.

I claim:

1. A safety device for a vehicle having a roof and a seat mounted on a floor, comprising in combination: a net means having top and bottom and opposite lateral side edges for intercepting forward movement of a seated person when the net means is extended into an open position from a folded position; a plurality of linking elements located and anchored serially onto each of the opposite lateral edges of the net means; two spaced apart elongated guide means, one end thereof being non-detachably secured to a forward portion of said roof and the other end thereof being detachably secured to the floor adjacent the rear side portion of the seat, said top edge of the net means being fixedly stretched between said guide means adjacent said roof; mass means mounted on said net means at a lower end portion of each of said lateral edges for facilitating opening of said net means into said open position, each of said mass means being structured to be axially slidable to and fro along said guide means; propulsion means for each of said mass means fixedly mounted adjacent the upper end of said guide means; said mass means being received in said propulsion means when said net means is in said folded position; means for actuating said propulsion means in response to a sudden deceleration of predetermined magnitude of the vehicle for propelling said mass means downwardly along said guide means; releasable latch means mounted on said guide means at a location spaced above said other end for automatically latching said mass means for holding said net means in said open position.

2. A vehicular safety device of claim 1, in which said mass means includes a slidable weight on each of the guide means elongated shape and being slidable therealong, and includes a sturdy flexible cord element secured to and extending between each of the slidable weights one at each end of the cord element, and between the slidable weights the cord element being secured to a lower portion of the net means such that when the net means is in the open position, the cord element extends across a passenger's lap in the nature of a seat belt.

3. A vehicular safety device of claim 2, in which the propulsion means includes an explosive cartridge and seating structure for seating one of the mass means in each explosive cartridge such that upon activation the mass means is fired downwardly along its respective guide means elongated shape to drag downwardly the base portion of the net means to thereby rapidly instantaneously open-up the net means.

4. A vehicular safety device of claim 1, in which the net means is a padded plastic fabric or steel mesh wire mesh defining space between the mesh thereof.

* * * * *